(12) United States Patent
Bahl et al.

(10) Patent No.: US 6,260,014 B1
(45) Date of Patent: Jul. 10, 2001

(54) SPECIFIC TASK COMPOSITE ACOUSTIC MODELS

(75) Inventors: Lalit Rai Bahl, Port Jefferson, NY (US); David Lubensky, Danbury, CT (US); Mukund Padmanabhan, Ossining; Salim Roukos, Scarsdale, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/153,222

(22) Filed: Sep. 14, 1998

(51) Int. Cl.[7] .................................................. G10L 15/04

(52) U.S. Cl. .......................... 704/254; 704/255; 704/231

(58) Field of Search .................................. 704/255, 231, 704/254

(56) References Cited

U.S. PATENT DOCUMENTS

| | | | |
|---|---|---|---|
| 5,819,221 | * 10/1998 | Kondo et al. ........................ | 704/255 |
| 5,825,978 | * 10/1998 | Digalakis et al. .................... | 704/255 |
| 5,875,426 | * 2/1999 | Bahl et al. ............................ | 704/255 |
| 5,953,701 | * 9/1999 | Neti et al. ............................ | 704/254 |
| 5,963,903 | * 10/1999 | Hon et al. ............................ | 704/254 |
| 5,995,931 | * 11/1999 | Bahl et al. ............................ | 704/257 |
| 6,029,124 | * 2/2000 | Gillick et al. ........................ | 704/200 |
| 6,061,653 | * 5/2000 | Fisher et al. ......................... | 704/256 |
| 6,067,517 | * 5/2000 | Bahl et al. ............................ | 704/256 |
| 6,070,139 | * 5/2000 | Miyazawa et al. .................. | 704/275 |
| 6,073,096 | * 6/2000 | Gao et al. ............................ | 704/245 |
| 6,076,056 | * 6/2000 | Huang et al. ........................ | 704/254 |

OTHER PUBLICATIONS

Bahl et al., "Maximum Mutual Information Estimation of Hidden Markov Model Parameters for Speech Recognition," Proceedings of the ICASSP, pp. 49–52, IEEE 1986.

Juang et al., "Minimum Classification Error Rate Methods for Speech Recognition," IEEE Transactions on Speech and Audio Processing, vol. 5, No. 3, pp. 257–265, May 1997.

Dempster et al., "Maximum Likelihood from Incomplete Data via the EM Algorithm," Journal of the Royal Statistical Society (B), No. 1, pp. 1–22, 1977.

Bahl et al., "A New Algorithm for the Estimation of Hidden Markov Model Parameters" IEEE, pp. 493–496, 1988.

Viterbi, "Error Bounds for Convolutional Codes and an Asymptotically Optimal Decoding Algorithm," IEEE Trans. Information theory, vol. IT–13, pp. 260–269, Apr. 1967.

* cited by examiner

*Primary Examiner*—Fan Tsang
*Assistant Examiner*—Michael N. Opsasnick
(74) *Attorney, Agent, or Firm*—F. Chau & Associates, LLP

(57) ABSTRACT

A method for recognizing speech includes the steps of providing a generic model having a baseform representation of a vocabulary of words, identifying a subset of words relating to an application, constructing a task specific model for the subset of words, constructing a composite model by combining the generic and task specific models and modifying the baseform representation of the subset of words such that the subset of words are recognized by the task specific model. A system for recognizing speech includes a composite model having a generic model having a generic baseform representation of a vocabulary of words and a task specific model for recognizing a subset of words relating to an application wherein the subset of words are recognized using a modified baseform representation. A recognizer compares words input thereto with the generic model for words other than the subset of words and with the task specific model for the subset of words.

27 Claims, 2 Drawing Sheets

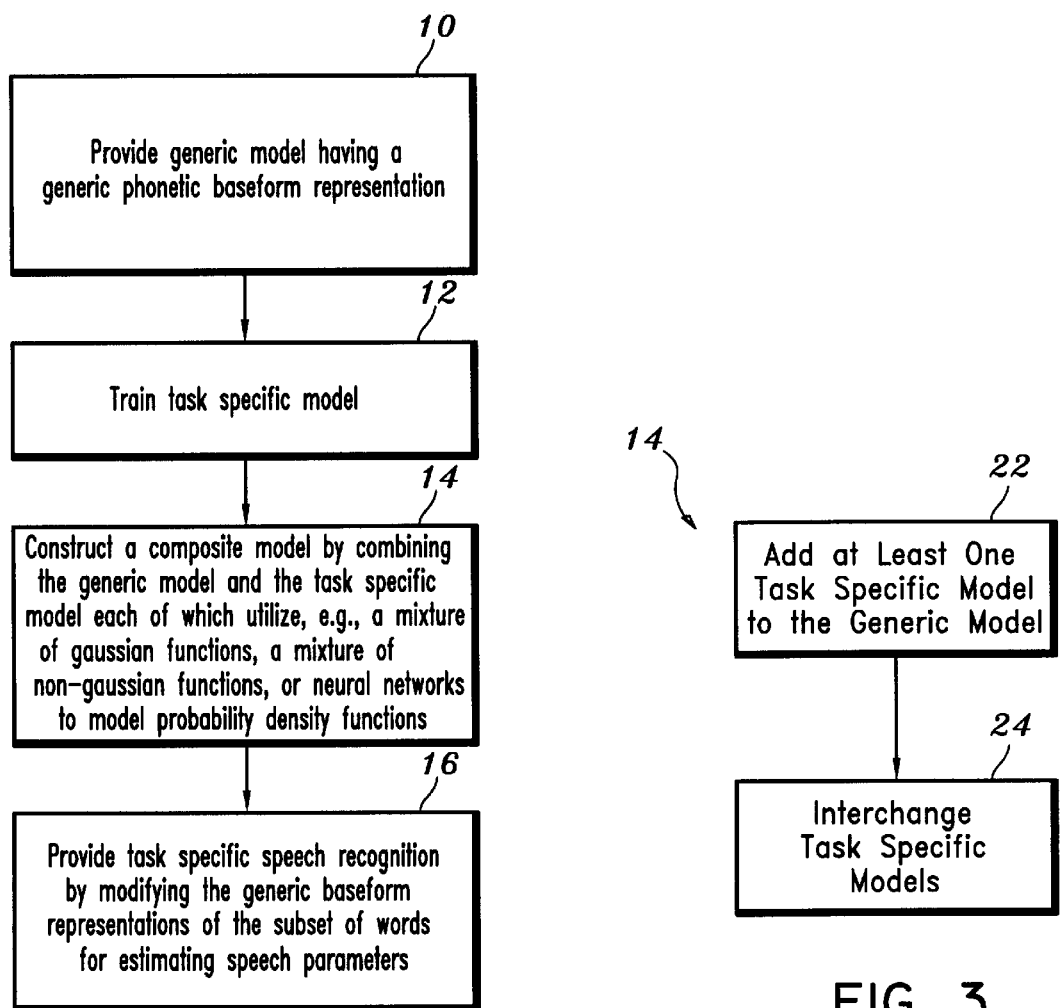
FIG. 1
FIG. 3
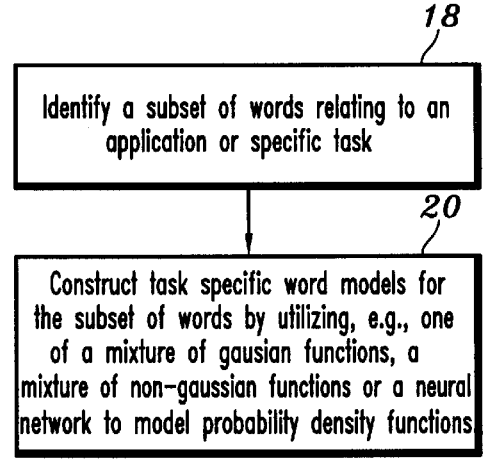
FIG. 2

SPECIFIC TASK COMPOSITE ACOUSTIC MODELS

BACKGROUND OF THE INVENTION

1. Field of the Invention

The present invention relates to speech recognition models and, more particularly, to composite acoustic models used for speech recognition for specific tasks.

2. Description of the Related Art

Speech recognition systems are used in many areas today to transcribe speech into text. The success of this technology in simplifying man-machine interaction is stimulating the use of this technology into a plurality of useful applications, such as transcribing dictation, voicemail, home banking, directory assistance, etc. Though it is possible to design a generic speech recognition system and use it in a variety of different applications, it is generally the case that a system is tailored to the particular application being addressed. In this way, a more efficient system having better performance is realized.

Typical speech recognition systems include three components, an acoustic model that models the characteristics of speech, a language model that models the characteristics of language and a vocabulary that includes words that are relevant to that application. Some applications require a large vocabulary, for example voicemail transcription, because a voicemail message could be related to any topic. However, some applications, such as home banking are likely to have a smaller vocabulary since a smaller set of possible transactions and therefore words are used. Depending on the application, some words may be more important than others. For example, in home banking, digit recognition is more important since personal identification numbers and transaction amounts must be correctly recognized. Hence, the word error performance in recognizing digits is more important than the remainder of the vocabulary.

Therefore, a need exists for a speech recognition system and method for providing improved performance on an application specific subset of words. A further need exists for a system and method capable of providing speech recognition of non-task specific speech along with task specific speech to form a task specific composite model. A still further need exists for a task specific model that is easily constructed and needs only a limited amount of training data for training it parameters.

SUMMARY OF THE INVENTION

A method for recognizing speech, in accordance with the present invention, includes the steps of providing a generic model having a baseform representation of a vocabulary of words, identifying a subset of words relating to an application, constructing task specific models for the subset of words, constructing a composite model by combining the generic model and the task specific model and modifying the baseform representation of the subset of words such that the task specific models are used when recognizing the subset of words.

Another method for recognizing speech includes the steps of constructing a generic model having a phonetic baseform representation of a vocabulary of words, constructing task specific models for a subset of words, constructing a composite model by combining the generic model and the task specific models, modifying the phonetic baseform representation of the subset of words such that the task specific models are used when recognizing the subset of words and the generic model is used in recognizing words other than the subset of words.

In alternate methods, the step of identifying a subset of words may include the step of identifying a subset words pertinent to a particular task. The step of constructing a task specific model may include the step of constructing the task specific model by utilizing a mixture of gaussians, non-gaussians or a neural network. The method may further include the step of estimating parameters of the composite model using an estimation technique. The estimation technique for the generic model may be different from the estimation technique for the task specific model. The step of constructing a task specific model may include the step of constructing the task specific model by utilizing a different construction technique from a construction technique used for the generic model. The generic model and the task specific model preferably include parametric models and the method may include the step of modeling task specific words and generic words based on a probability density function. The generic model and the task specific model may have different probability density functions. The step of interchanging the task specific model with a different task specific model to create a new composite model may also be included.

A system for recognizing speech, in accordance with the present invention includes a composite model which includes a generic model having a baseform representation of a vocabulary of words and a task specific model for recognizing a subset of words relating to an application wherein the subset of words are recognized using a modified baseform representation. A recognizer is also included for comparing words input thereto with the generic model for words other than the subset of words and with the task specific model for the subset of words.

In alternate embodiments of the system, the recognizer preferably includes a processor. The generic model and the task specific model may use different parametric models for modeling probability density functions. The generic model and the task specific model may be constructed using different construction techniques. The generic model and the task specific model may provide different probability estimation techniques for recognizing speech. A plurality of task specific models for applying to a plurality of applications may also be included.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 1 is a block/flow diagram of a speech recognition system/method in accordance with the present invention;

FIG. 2 is a block/flow diagram of the speech recognition system/method of FIG. 1, in accordance with the present invention, showing block 12 in further detail;

FIG. 3 is a block/flow diagram of the speech recognition system/method of FIG. 1, in accordance with the present invention, showing block 14 in further detail.

DETAILED DESCRIPTION OF PREFERRED EMBODIMENTS

Figure 4:
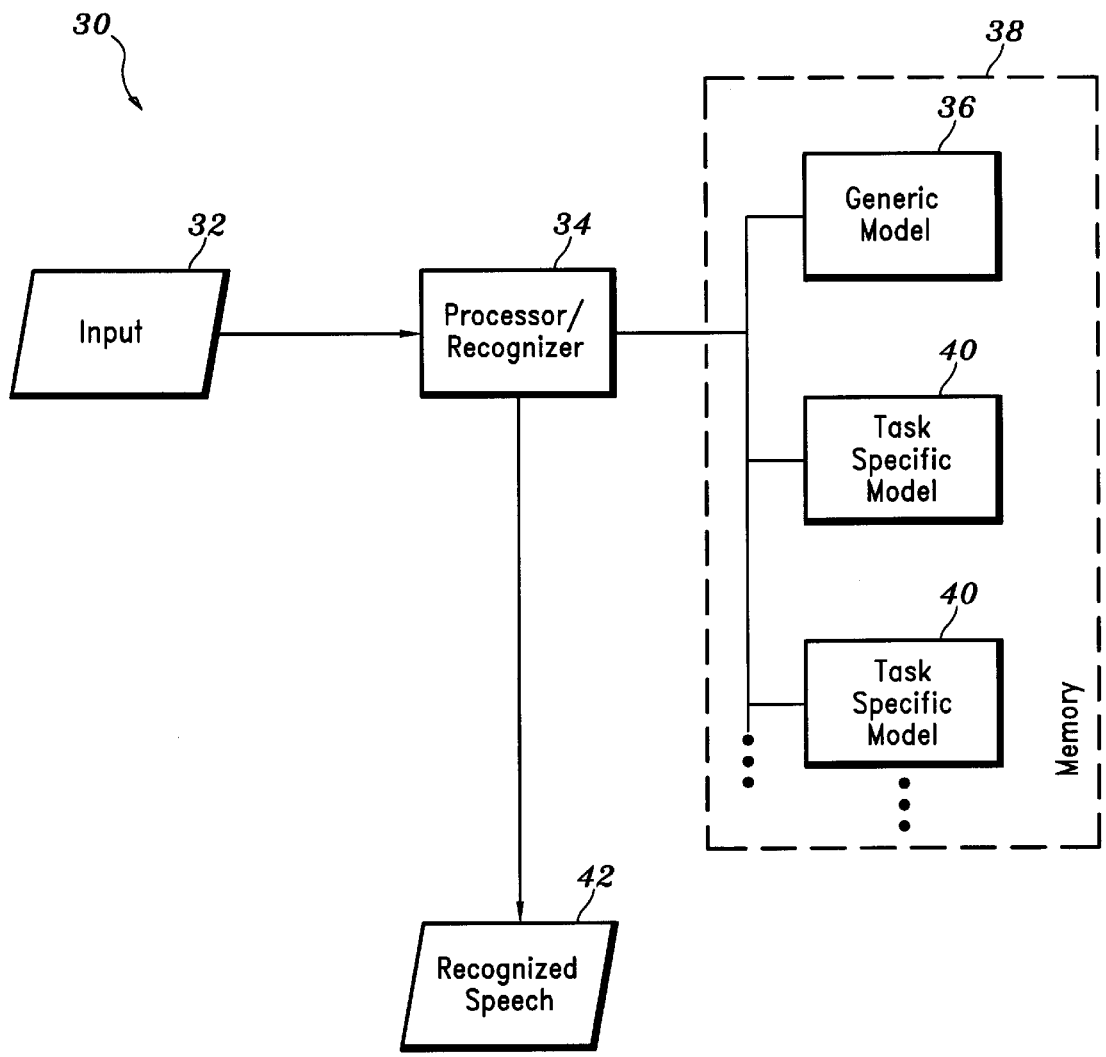
FIG. 4 is a block diagram of a speech recognition system in accordance with the present invention.

The present invention relates to speech recognition models and, more particularly, to composite acoustic models used for speech recognition for specific tasks. A system and method is provided whereby a generic speech recognition system is used for a given application. The generic system then has identified words that are particularly important to a specific application. A set of acoustic models are constructed for those words that are more important to the specific task to provide better overall speech recognition performance. The task specific models in some instances may include only task specific speech models and may not be useful for generic speech. To expand the capabilities of the system, a composite model may be provided in accordance with the present invention. A task specific model is added to the generic model to handle recognition of other words and at the same time gives better performance in recognizing the particular words that are important to the application or specific task being considered. In this way, a more efficient and reliable speech recognition system is realized.

Speech recognition systems generally represent words in a vocabulary by a sequence of fundamental acoustic units such as phones (referred to as a baseform of the word, An inventory of possible phones is usually about 50, and the acoustic model models a probability distribution of feature vectors for each of these acoustic units.

Acoustic models are constructed during a training process. During the process of training, feature vectors are extracted periodically from input speech. These feature vectors are aligned with the appropriate acoustic units. For example, considering an utterance, such as "good morning" which has a phonetic baseform "G UH DD M AXR N IX NG", and assume that the speech corresponding to this utterance was for example 5 seconds long. A feature vector is extracted in increments of time for example in 10 ms increments. In this example 500 feature vectors are obtained for the 5 second utterance. The feature vectors are then aligned to a phone sequence corresponding to the utterance either using dynamic programming, for example using a Viterbi algorithm, which allocates each feature vector to only one phone, or using a probabilistic assignment, for example using a maximum likelihood technique, where each feature vector is assigned to each phone in the sequence according to some probability. Subsequently, for each phone, a probability density function (pdf) of the feature vectors that belong to that phone are modeled by the acoustic model. One approach to modeling the pdf includes the use of a mixture of multi-dimensional gaussians. Hence, a generic speech recognizer includes an acoustic model that models the pdf of the 50 or so acoustic units.

In one example, an application may include any one of several thousand words including digits, and a specific task wherein digits are of primary concern. In this example, good performance in recognizing these digits is important. A baseform may be written for different digits using the same phone set as was used for the generic recognizer described above. Table one summarizes the phonetic baseforms for digits zero through nine and oh (for zero).

TABLE 1

| ONE | W AH N |
| TWO | T UW |
| THREE | TH R IY |
| FOUR | F AO R |
| FIVE | F AY V |
| SIX | S IH K S |
| SEVEN | S EH V AX N |
| EIGHT | EY TD |
| NINE | N AY N |
| ZERO | Z IH R OW |
| OH | OW |

Word-specific models provide better performance on small vocabulary tasks, such as, in this example, digit recognition. In accordance with the present invention, a task specific model is constructed based on a specific vocabulary. For the illustrative example, one way to create a task specific model is to add a new set of acoustic units to the set of generic acoustic units (as described in TABLE 1) that will be used only in representing task specific speech, such as the new phonetic baseforms for digits indicated in TABLE 2.

TABLE 2

| ONE | W1 AH1 N1 |
| TWO | T2 UW2 |
| THREE | TH3 R3 IY3 |
| FOUR | F4 AO4 R4 |
| FIVE | F5 AY5 V5 |
| SIX | S6 IH6 K6 S6 |
| SEVEN | S7 EH7 V7 AX7 N7 |
| EIGHT | EY8 TD8 |
| NINE | N9 AY9 N9 |
| ZERO | Z0 IH0 R0 OW0 |
| OH | OW0b |

Hence, the acoustic unit T2 is only used in the phonetic baseform of the digit TWO and specifically for recognizing the digit TWO. The acoustic models that model the pdf of the feature vectors for the new phones are then estimated from training utterances that include only digits.

One advantage of this method is that it includes new models for the specific words which are not influenced by the contents of the generic model. This provides flexibility in adjusting the word models as needed without impact to the generic model. For example, there may be additional value in modeling sub-regions of vowels in the task specific words. In the illustrative example, the digits two, eight and oh (for zero) may include a new set of baseforms which may be included without impact to the generic models. The new baseforms may be as shown in TABLE 3.

TABLE 3

| TWO | T2 UW2a UW2b |
| EIGHT | EY8a EY8b TD8 |
| OH | OW0ba OW0bb |

An additional advantage of the word modeling in accordance with the present invention is that different methods may be used to estimate parameters of the generic acoustic model and the task specific acoustic model. For example, the model for pdf of the generic acoustic units may be mixtures of gaussians, whereas the model for the pdf of the task specific word models may be a neural network.

Different methods may also be used to estimate parameters of the acoustic models. One method may be to estimate the parameters of acoustic models using maximum likelihood (ML) which works well for the generic case. For example, the training utterance "good morning" is used for ML training. If the pdf of each phone is modeled as a mixture of gaussians, means, variances and priors of the gaussians are estimated so as to maximize the likelihood of the feature vectors that align to the phone sequence "G UH DD M AXR N IX NG". Alternative estimation techniques are useful and are contemplated for use with the present invention. These techniques may include discriminant estimation techniques, such as those described in L. R. Bahl, et al., "Maximum mutual information estimation of hidden Markov model parameters for speech recognition", Proceedings of the ICASSP, pp 49–52, 1986; L. R. Bahl, et al., "A new way of estimating parameters of HMM's", Proceedings of the ICASSP, pp 489–493, 1988; and B. H. Juang, et al., "Minimum classification error rate methods for speech recognition", IEEE Trans. Speech and Audio Processing, vol. 5 pp 257–265, May 1997, all incorporated herein by reference. The discriminant estimation techniques attempt to increase the likelihood of the feature vectors when aligned to a correct phone sequence, and decrease the likelihood of the feature vectors when they align to incorrect phone sequences. In one illustrative example, the word sequence "goodman ink" sounds similar to "good morning" and can be represented by the phone sequence "G UH D M AE N IX N KD". If the acoustic models are estimated via ML to maximize the likelihood of the feature vectors when the acoustic models are aligned to the sequence "G UH DD M AXR N IX NG", the acoustic models also give a high likelihood when aligned to the sequence "G UH D M AE N IX N KD" as the two sequences are acoustically similar and confusion may arise. Consequently, discriminant estimation techniques attempt to resolve the acoustic differences by estimating the model parameters so as to simultaneously maximize the likelihood on the correct phone sequence and minimize the likelihood on the incorrect phone sequence.

Discriminant estimation techniques may generally outperform ML techniques for small vocabulary tasks. Consequently, parameter estimating systems for the task specific word models may be different from parameter estimating systems used for the generic model.

Once constructed, the task specific word models are added onto the generic model. The phonetic baseforms for the words used in the application includes both task specific words, such as digits or technical words, and generic words. In the illustrative example, the baseforms of the digits are changed to use the digit-specific phones, but the baseforms of the remaining words are left unchanged. A composite system is therefore provided in accordance with the present invention.

The composite system is constructed such that the system is capable of dealing with large vocabulary applications, while improving recognition performance on a subset of the vocabulary that is particularly important for the application being considered. Further, the composite system may include a plurality of task specific vocabularies which may be implemented at appropriate times during speech recognition. Each task specific subsystem having its own task specific vocabulary.

An additional advantage of the present invention is that the present system may be easily applied to develop models for different applications. For example once a generic system is trained, task specific systems may easily be added or interchanged to provide the task specific speech recognition system. In general, the task specific portion of the composite model is relatively small compared to the generic model, and the task specific model may be trained from a much smaller set of training data. A much larger amount of training data is needed to train the parameters of the generic model, hence if it were necessary to train the generic model to provide good performance for a particular application, it would require the collection of a large amount of training data for each application being considered. In accordance with the present invention, the generic model remains the same and therefore training for the task specific portion only is needed.

It should be understood that the elements shown in FIGS. 1–5 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a flow/block diagram is shown in accordance with the present invention. In block 10, a generic model is provided. As described above, this is typically constructed based on training data of a large vocabulary of words. In block 12, a task specific model or models are trained. In particular, task specific words are presented for improved recognition performance. The task specific models are constructed independently from the generic model. In this way, the advantages of the present invention are more readily apparent. Task specific models are application dependent and may include applications that rely on a specific and relatively smaller vocabulary of words. Advantageously, as described above, the method of training of the specific task models may differ from the method of training the generic model, i.e., neural network versus mixtures of gaussians.

In block 14, the task specific models are added to the generic model to construct a composite model which can handle a large vocabulary of words, but has improved performance in recognizing the task specific words. The speech recognition occurs in block 16. The method of recognition of generic words (non-task specific) may advantageously differ from the recognition method for task specific words, i.e., discriminate estimation techniques may be used for the task specific words while maximum likelihood may be used for the generic words.

Referring to FIG. 2, block 12 may include blocks 18 and 20. In block 18, the subset of task specific words are identified for task specific training. In block 20, a task specific model is constructed based on the subset of words identified in block 18. In this way, an independent task specific model is created. Improved performance for recognizing task specific words may include creating a new set of phonetic baseforms for the task specific words.

Referring to FIG. 3, block 14 may include blocks 22 and 24. In constructing the composite model, a plurality of task specific models may be used. In block 22 a composite model is formed by adding at least one task specific model to the generic model. In block 24, the task specific models may be interchanged depending of the application of the speech recognition system while maintaining the same generic model.

Referring to FIG. 4, a speech recognition system is shown and referred to generally as system 30. System 30 is useful for both training and speech recognition. An input device may include a microphone or other input mechanism for recording speech. During training, data is collected and stored in a memory 38 by processor 34. During generic model training, acoustic data is stored in a generic model 36 within memory 38. Independent task specific models are also trained and stored in task specific models 40 of memory 38.

When system 30 is used for speech recognition, words are identified using generic model 36 and task specific model(s) 40 thereby providing recognized speech at an output 42.

Having described preferred embodiments of a task specific speech recognition system and method (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for recognizing speech comprising the steps of:
   providing a generic model having a generic phonetic baseform representation of a vocabulary of words;
   identifying a subset of words relating to an application;
   constructing a task specific model for the subset of words;
   constructing a composite model by combining the generic model and the task specific model; and
   modifying the generic phonetic baseform representation of the subset of words such that the task specific model is used to recognize the subset of words.

2. The method as recited in claim 1, wherein the step of identifying a subset of words includes the step of identifying a subset words pertinent to a particular task.

3. The method as recited in claim 1, wherein the step of constructing a task specific model includes the step of constructing the task specific model by utilizing a mixture of gaussian functions to model a probability density function of feature vectors for different words in the vocabulary.

4. The method as recited in claim 1, wherein the step of constructing a task specific model includes the step of constructing the task specific model by utilizing a mixture of non-gaussian functions to model a probability density function of feature vectors for different words in the vocabulary.

5. The method as recited in claim 1, wherein the step of constructing a task specific model includes the step of constructing the task specific model by utilizing a neural network to model a probability density function of feature vectors for different words in the vocabulary.

6. The method as recited in claim 1, further comprising the step of estimating parameters of speech using an estimation technique.

7. The method as recited in claim 1, wherein an estimation technique for the generic model is different from an estimation technique for the task specific model.

8. The method as recited in claim 1, wherein the step of constructing a task specific model includes the step of constructing the task specific model by utilizing a different construction technique than a construction technique used for the generic model.

9. The method as recited in claim 1, wherein generic model and the task specific model include parametric models and further comprising the step of modeling a probability density function of feature vectors for task specific words and generic words.

10. The method as recited in claim 9, wherein the generic model and the task specific model have different probability density functions.

11. The method as recited in claim 1, further comprising the step of interchanging the task specific model with a different task specific model to create a new composite model.

12. A method for recognizing speech comprising the steps of:
   constructing a generic model having a phonetic baseform representation of a vocabulary of words;
   constructing a task specific model for a subset of words;
   constructing a composite model by combining the generic model and the task specific model;
   modifying the phonetic baseform representation of the subset of words such that the subset of words are recognized by the task specific model; and
   recognizing words other than the task specific words using the generic model.

13. The method as recited in claim 12, wherein the step of constructing a task specific model includes the step of constructing the task specific model by utilizing a mixture of non-gaussian functions to model a probability density function of feature vectors for different words in the vocabulary.

14. The method as recited in claim 12, wherein the step of constructing a task specific model includes the step of constructing the task specific model by utilizing a mixture of gaussian functions to model a probability density function of feature vectors for different words in the vocabulary.

15. The method as recited in claim 12, wherein the step of constructing a task specific model includes the step of constructing the task specific model by utilizing a neural network to model a probability density function of feature vectors for different words in the vocabulary.

16. The method as recited in claim 12, further comprising the step of estimating parameters of speech using an estimation technique.

17. method as recited in claim 12, wherein an estimation technique for the generic model is different from an estimation technique for the task specific model.

18. The method as recited in claim 12, wherein the step of constructing a task specific model includes the step of constructing the task specific model by utilizing a different construction technique than a construction technique used for the generic model.

19. The method as recited in claim 12, wherein generic model and the task specific model include parametric models and further comprising the step of modeling a probability density function of feature vectors for task specific words and generic words.

20. The method as recited in claim 19, wherein the generic model and the task specific model have different probability density functions.

21. The method as recited in claim 12, further comprising the step of interchanging the task specific model with a different task specific model to create a new composite model.

22. A system for recognizing speech comprising:
   a composite model including:
      a generic model having a baseform representation of a vocabulary of words; and
      a task specific model for recognizing a subset of words relating to an application wherein the subset of words are recognized using a modified baseform representation; and
   a recognizer for comparing words input thereto with the generic model for words other than the subset of words and with the task specific model for the subset of words.

23. The system as recited in claim 22, wherein the recognizer includes a processor.

24. The system as recited in claim 22, wherein the generic model and the task specific model use different parametric models for modeling probability density functions.

25. The system as recited in claim 22, wherein the generic model and the task specific model are constructed using different construction techniques.

26. The system as recited in claim 22, wherein the generic model and the task specific model provide different probability estimation techniques for recognizing speech.

27. The system as recited in claim 20, further comprising a plurality of task specific models for applying to a plurality of applications.

* * * * *